United States Patent
Veygman et al.

(10) Patent No.: US 9,582,078 B1
(45) Date of Patent: Feb. 28, 2017

(54) INTEGRATED TOUCHLESS JOYSTICK-TYPE CONTROLLER

(71) Applicant: Maxim Integrated Products, Inc., San Jose, CA (US)

(72) Inventors: Ilya K. Veygman, Palo Alto, CA (US); Richard I. Olsen, Truckee, CA (US); Daniel S. Christman, Campbell, CA (US); Vishnudev Ramakrishnan, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 95 days.

(21) Appl. No.: 14/073,937

(22) Filed: Nov. 7, 2013

Related U.S. Application Data

(60) Provisional application No. 61/840,921, filed on Jun. 28, 2013.

(51) Int. Cl.
*G06F 3/033* (2013.01)
*G06F 3/01* (2006.01)

(52) U.S. Cl.
CPC .................... *G06F 3/017* (2013.01)

(58) Field of Classification Search
USPC ....... 345/156, 158, 173, 690, 168, 174, 157, 345/207; 382/291; 324/686
See application file for complete search history.

(56) References Cited

U.S. PATENT DOCUMENTS

| | | | |
|---|---|---|---|
| 7,253,643 B1 * | 8/2007 | Seguine | G06F 3/044 324/686 |
| 7,860,344 B1 * | 12/2010 | Fitzpatrick et al. | 382/291 |
| 2006/0152487 A1 * | 7/2006 | Grunnet-Jepsen | G06F 3/0346 345/158 |
| 2010/0214214 A1 * | 8/2010 | Corson et al. | 345/158 |
| 2011/0032230 A1 * | 2/2011 | Sun | G06F 3/0346 345/207 |
| 2011/0095980 A1 * | 4/2011 | Sweetser | G06F 3/0346 345/158 |
| 2011/0163952 A1 * | 7/2011 | Hong | G06F 3/0346 345/157 |
| 2012/0019442 A1 * | 1/2012 | Warne | G06F 3/0325 345/157 |

(Continued)

OTHER PUBLICATIONS https://web.archive.org/web/20120522145455/http://www.leapmotion.com/.
https://web.archive.org/web/20101104023553/http://www.xbox.com/en-US/kinect.

*Primary Examiner* — Thuy Pardo
(74) *Attorney, Agent, or Firm* — Advent, LLP

(57) ABSTRACT

Techniques are described to furnish a touchless joystick-type controller in a portable electronic device. The techniques may be implemented within an electronic device that comprises one or more sensors configured to detect a target at a distance from the sensor and provide a signal in response thereto. The signal is received in response to the sensor detecting a target within a field of view of the sensor. A position of the target relative to a point of reference is then determined based on the signal. Movement of the target may be tracked based on changes in the determined position relative to the point of reference. In embodiments, the target comprises a thumb or a finger of a hand of a user of the electronic device and the determined position to furnish a joystick-type control input.

37 Claims, 7 Drawing Sheets

(56) References Cited

U.S. PATENT DOCUMENTS

| | | | |
|---|---|---|---|
| 2012/0113000 A1* | 5/2012 | Chao | G06F 3/0325 345/157 |
| 2012/0165096 A1* | 6/2012 | Geisner et al. | 463/36 |
| 2012/0188292 A1* | 7/2012 | Inoue et al. | 345/690 |
| 2012/0280107 A1 | 11/2012 | Skurnik et al. | |
| 2013/0027296 A1* | 1/2013 | Klein et al. | 345/156 |
| 2013/0147712 A1* | 6/2013 | Zhou et al. | 345/158 |
| 2013/0293477 A1* | 11/2013 | Chen | G06F 3/02 345/168 |
| 2014/0043283 A1* | 2/2014 | Kim | G06F 3/0416 345/174 |
| 2014/0333562 A1* | 11/2014 | Kryze et al. | 345/173 |
| 2015/0091800 A1* | 4/2015 | Liberty | G06F 3/0346 345/158 |

* cited by examiner

INTEGRATED TOUCHLESS JOYSTICK-TYPE CONTROLLER

The present application claims priority, under 35 U.S.C. 119(e), to U.S. Provisional Application Ser. No. 61/840,921 entitled: INTEGRATED TOUCHLESS JOYSTICK-TYPE CONTROLLER, filed on Jun. 28, 2013, which is herein incorporated by reference in its entirety.

BACKGROUND

Touchscreens are common in portable electronic devices such as smartphones and tablets. A touchscreen allows a user of the portable electronic device to enter data and control functions of the device by touching the screen with one or more fingers, a stylus, or the like. The touchscreen enables the user to interact directly with displayed information. A user can, for example, input a command by touching the screen in a predetermined pattern to cause the device to perform a corresponding function.

Touchscreens, when implemented with gaming applications, are used to input commands for controlling the game. A user can progress through a game by touching visual representations of characters, objects, and so forth displayed on the screen in order to manipulate them.

SUMMARY

Techniques are described to furnish a touchless joystick-type controller in a portable electronic device. In one or more embodiments, the techniques may be implemented within an electronic device that comprises one or more sensors (e.g., one or more multisegmented proximity sensors or gesture sensors) configured to detect a target at a distance from the sensor and provide a signal in response thereto. The signal is received in response to the sensor detecting a target within a field of view of the sensor. A position of the target relative to a point of reference is then determined based on the signal. Movement of the target may be tracked based on changes in the determined position relative to the point of reference. In embodiments, the target comprises a thumb or a finger of a hand of a user of the electronic device and the determined position to furnish a touchless joystick-type control input such as a joystick control input, a thumbstick control input, a D-pad control input, or the like.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1A:
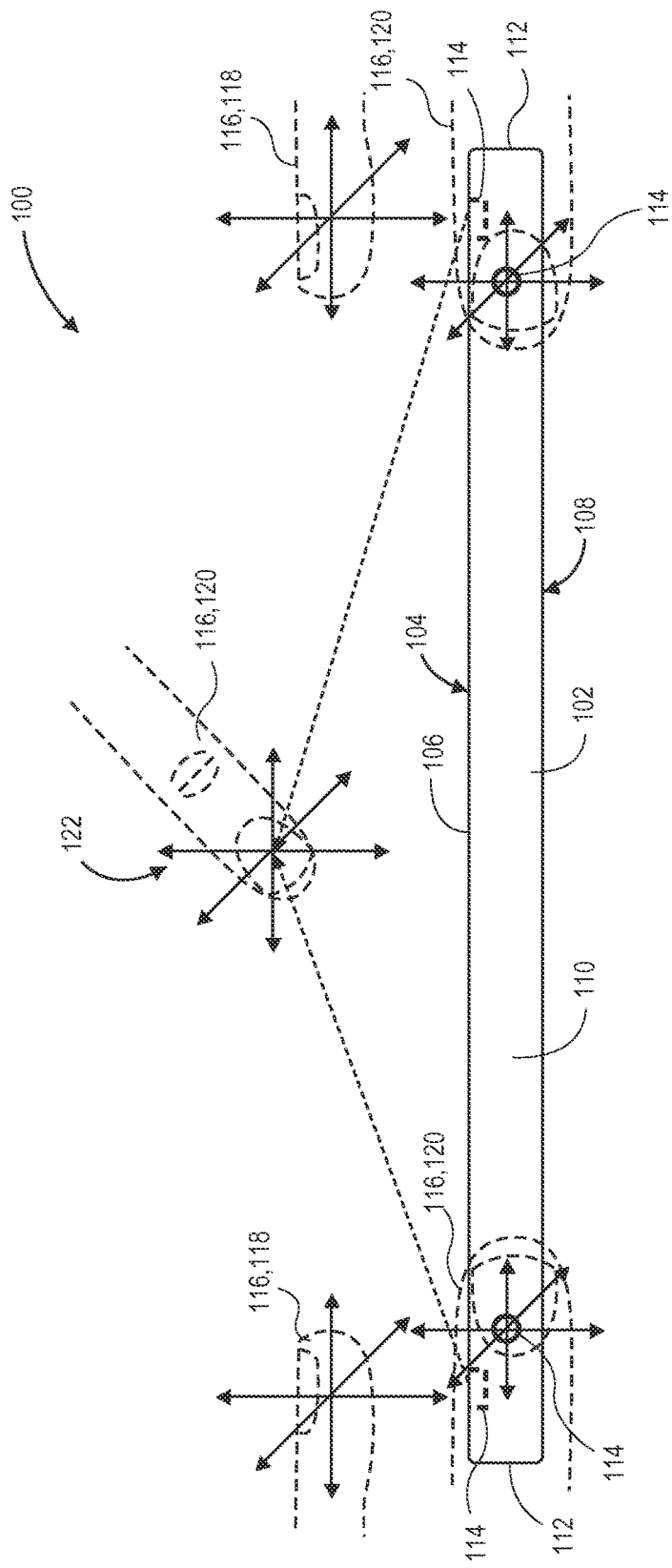
FIG. 1A is a diagrammatic side elevation view of a portable electronic device that is configured to furnish a touchless joystick-type controller in accordance with example implementations of the present disclosure.

One drawback of using the touchscreens of portable electronic devices, such as smartphones, tablets, and so forth, with gaming applications is the inability of the touchscreen to furnish appropriate controls. Unlike physical game controllers, such as a joystick, touchscreens often do not permit sufficiently fine motor control to fully implement a game's functionality. Additionally, dedicating a portion of the touchscreen to accept a user's touch input reduces the portion of the display that is available for viewing the game's visual information. This limitation is a significant drawback for a portable electronic device with limited screen size compared to a stationary electronic device employing a dedicated display and game controllers. Moreover, since the touchscreen overlays the display of the portable electronic device, the display of visual information on the display can be obstructed by the user's hand and/or fingers. For example, a user touching the screen to move a character can obstruct his or her view of visual information proximate to the user's finger.

Touchscreens may also fail to furnish sufficient controls for many gaming applications. Typically, touchscreens provide only two dimensional controls (e.g., x-y controls). However, many gaming applications require three dimensional controls (e.g., x-y-z controls). Further, many gaming applications require additional controls to provide increased functionality such as field of view controls, controls providing game functions, and so forth. Implementing such controls further reduces the portion of the display that is available for viewing the game's visual information.

Gesture detection and recognition can provide new and more intuitive human-machine interfaces (HMIs) for electronic devices in comparison to other interfaces. Gesture recognition can be used to interpret human gestures via mathematical algorithms. Although gestures can originate from any bodily motion or state, detecting and interpreting face or hand (including fingers) gestures can enable users to interact more naturally with electronic devices than keyboards, mice, or touchscreens.

Accordingly, techniques are described to furnish a touchless joystick-type controller. In one or more implementations, the techniques may be implemented within a portable electronic device such as a smartphone or tablet computer. The portable electronic device comprises one or more sensors (e.g., a multisegmented proximity sensor or gesture sensor) that may be positioned generally adjacent to the ends of the device, on either side of the display of the device. The sensors are configured to detect a target at a distance from the sensor, and to provide a signal in response thereto. A position of the target relative to a point of reference such as the center of the sensor is then determined based on the signal. Movement of the target may be tracked based on changes in the determined position relative to the point of reference. In embodiments, the target comprises a thumb or a finger of a hand of a user of the electronic device and the determined position to furnish a joystick-type control input such as a D-pad control input, a thumbstick control input, a joystick control input, and so forth.

The present techniques may be employed in gaming and screen navigation applications in portable (e.g., hand held devices) electronic devices that employ gesture sensors. The techniques thus facilitate the integration of gaming controller/track pointer functionality (e.g., functionality similar to that furnished by controllers employed by Microsoft Xbox 360® gaming systems (Microsoft Corporation, Redmond, Wash.), Sony PlayStation® gaming systems (Sony Electronics Inc., San Diego Calif.), Wii® gaming systems (Nintendo of America Inc., Redmond, Wash.), and so forth)) into such devices without the addition of mechanical controls such as joysticks, thumbsticks, or D-pad controls. The techniques thus may augment touchscreen inputs, and/or may allow motor control to be moved off-screen without the need of additional, mechanical hardware.

Example Electronic Device

FIG. 1A depicts an electronic device 100 that is configured to furnish a touchless joystick-type controller in accordance with example implementations of the present disclosure. The portable electronic device 100 generally includes a housing 102 having a front surface 104 in which a display 106 is disposed, a back surface 108, left and right sides 110, and top and bottom ends 112. As shown, one or more sensors 114 are disposed in the housing 102 along the front surface 104. For example, in the embodiment shown, sensors 114 may be mounted within the housing 102 beneath the front surface 104. In such embodiments, one or more apertures may be formed within the front surface 106 over the sensor 114 to permit the transmission/detection of electromagnetic radiation (e.g., light) by the sensors 114. In other embodiments, the sensor 114 may be formed as an integral component of the front surface 106, or may be mounted to the front surface 106 above, within, or below the front surface 106 of the housing 102. In some embodiments, additional sensors 114 are disposed in the housing 102 along the back surface 108, sides 110, and/or the ends 112 of the housing 102. These sensors 114 may be mounted within the housing 102 beneath the respective back surface 108, side 110, and/or the end 112 along which they are disposed. In embodiments, one or more apertures may be formed in the respective back surface 108, side 110, and/or the end 112 over the sensors 114 to permit the transmission/detection of electromagnetic radiation (e.g., light) by the sensors 114. In other embodiments, the sensors 114 may be formed as an integral component of the respective back surface 108, side 110, and/or the end 112, or may be mounted to the respective back surface 108, side 110, and/or the end 112 above, within, or below the back surface 108, side 110, and/or the end 112 of the housing 102.

As discussed herein, the sensors 114 are configured to detect a target 116 (e.g., a thumb 118 or a finger 120 of a hand of a user of the electronic device 100) at a distance from the sensor 114 and provide a signal in response thereto. A position of the target 116 relative to a point of reference is then determined based on the signal. In embodiments, the point of reference may comprise a center of the sensor 114. However, the point of reference may be any chosen point of reference. For example, it is contemplated that the point of reference may be other points on the face of the sensor, other points on or within the housing 102 (e.g., on the front surface 104, back surface 106, sides 110, or ends 112) of the portable electronic device 100, a point in space proximal to the portable electronic device 100, and so forth. It is to be apparent that, a sensor 114 may implement a first point of reference when operating independently and a second point of reference when operating with one or more other sensors, e.g., in a networked fashion if two sensors are used to track a target. The sensors 114 can be configured so that a target does not obscure observation of the display 106 during detection. For example, one or more of the sensors 114 can be oriented so that the thumb 118 of the user does not substantially block the display 106 when the user is manipulating the touchless joystick-type controller.

Motion of the target 116 (e.g., a thumb 118 or a finger 120 of a hand of a user of the electronic device 100) may be tracked based on changes in the determined position relative to the point of reference. In embodiments, motion of a target 116 may be tracked in two dimensions (e.g., parallel to the front surface 104, back surface 108, sides 110, or ends 112 of the housing 102), or in three dimensions (e.g., parallel and/or perpendicular to the front surface 104, back surface 108, sides 110, or ends 112 of the housing 102).

The determined position of the target 116 may be processed as discussed herein to furnish a touchless joystick-type control input to the portable electronic device 100. The determined position may be used to determine an attribute such as distance associated with the target, a motion of the target, a direction of the target, acceleration of the target, or a gesture. The attribute can correspond to a function to be performed responsive to receipt of one or more signals associated with the attribute. For instance, a swipe gesture can result in the processor changing a field of view for a gaming application.

Example joystick-type control inputs include, but are not limited to, D-pad control inputs, thumbstick control inputs, joystick control inputs, combinations thereof, and so forth. The joystick-type control inputs may be furnished to applications (e.g., gaming applications) executed by the processor of the electronic device 100 as discussed below in the descriptions of FIG. 2. In embodiments, sensors 114 are positioned proximate to the ends 112 of the housing 102 on either side of the display 106 to furnish dual touchless joystick-type controllers. Sensors may also be positioned along the sides 110 and/or ends 112 of the housing 102 to allow the user to grasp the portable electronic device 100 using both hands and manipulate multiple touchless controls (e.g., joystick, thumbstick, D-pad, buttons) in a fashion similar to that of a hand-held controller employed by a gaming system (e.g., Microsoft Xbox 360® gaming systems, Sony PlayStation® gaming systems, Wii® gaming systems and so forth). For example, the sensor may be positioned in an ergonomically efficient manner to permit manipulation of the virtual joystick without interfering with a user viewing the display.

In embodiments, respective ones of the sensors 114 shown in FIG. 1A may be synchronized with other sensors 114 to allow one sensor 114 to receive data from another sensor 114. This synchronization may be used to augment the position and/or motion detection functionality (and generation of the joystick-type control input) by adding functionality such as stereoscopy or triangulation to improve the overall performance of the sensors 114 in comparison to operating independently. For example, in one embodiment, synchronization may be used to implement a touchless optical mouse-type input, with the target (e.g., a user's finger) being used to furnish a touchless variant of a mouse input to control and maneuver a mouse cursor displayed by the display 106, without requiring that the user touch the display (touchscreen) 106. When coupled with a secondary input such as a touchless joystick-type control input, as described above, this touchless optical mouse input can be used to emulate a "WASD+mouse" input, which is used in a variety of gaming applications.

In embodiments, the configuration of sensors 114 employed to furnish touchless joystick-type control inputs can be used in tandem with swipe-based gesture sensor inputs 122 (e.g., swipe up/across, pinch, expand, etc.). Thus, one sensor 114 may be used to detect both the position of a first target 116 (e.g., a thumb 118 of the hand of a user used to furnish a joystick-type input) and the motion of a second target (e.g. a finger 120 of the hand of a user used to furnish a hand swipe). These inputs may, but need not be, concurrent. For example, the sensor 114 can be configured to switch between two operating modes based upon either a user command or based upon the context of the input.

Figure 1B:
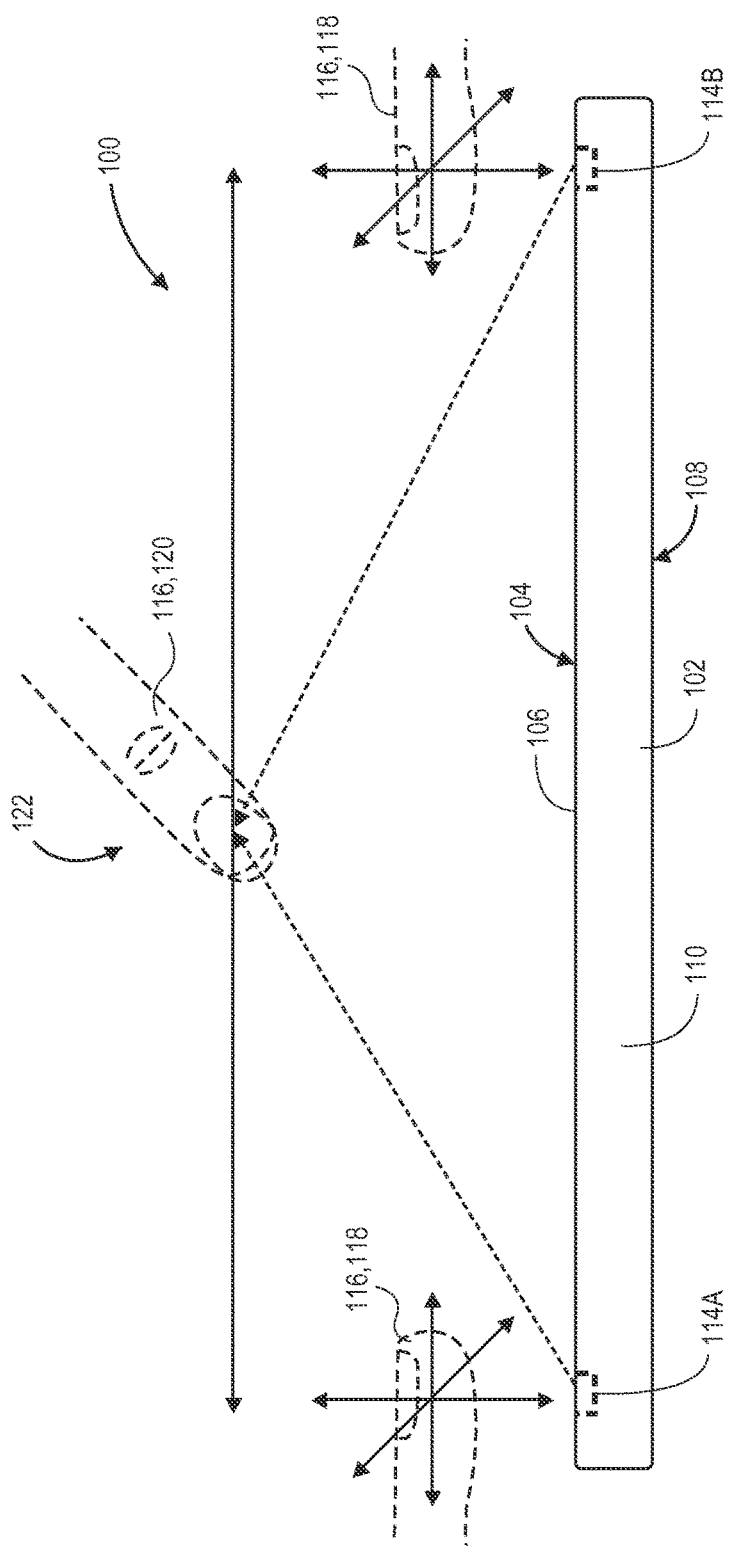
FIG. 1B is a diagrammatic side elevation view of a portable electronic device shown in FIG. 1A, wherein gestures performed over a first sensor can be distinguished from gestures performed over a second sensor, or over two or more sensors.

In this manner, differentiation of gestures based upon actions on (performed over) one sensor versus actions on (performed over) multiple sensors may be furnished. As shown in FIG. 1B, a gesture performed over (across) a first (e.g., left or bottom) sensor 114A only can be interpreted differently from the same gesture performed over (across) a second (e.g., right or top) sensor 114B, or a gesture performed over both sensors 114A, 114B. For example, a gesture performed over one sensor (e.g., sensor 114A) may be associated with one attribute while a gesture performed over two sensors (e.g., sensors 114A and 114B) may be associated with a different attribute and, for example, result in a different function. Moreover, differentiation of gestures can be combined with tandem usage of swipe gestures and target position tracking (e.g., to furnish joystick-type control inputs) into complex gestures.

Figure 2A:
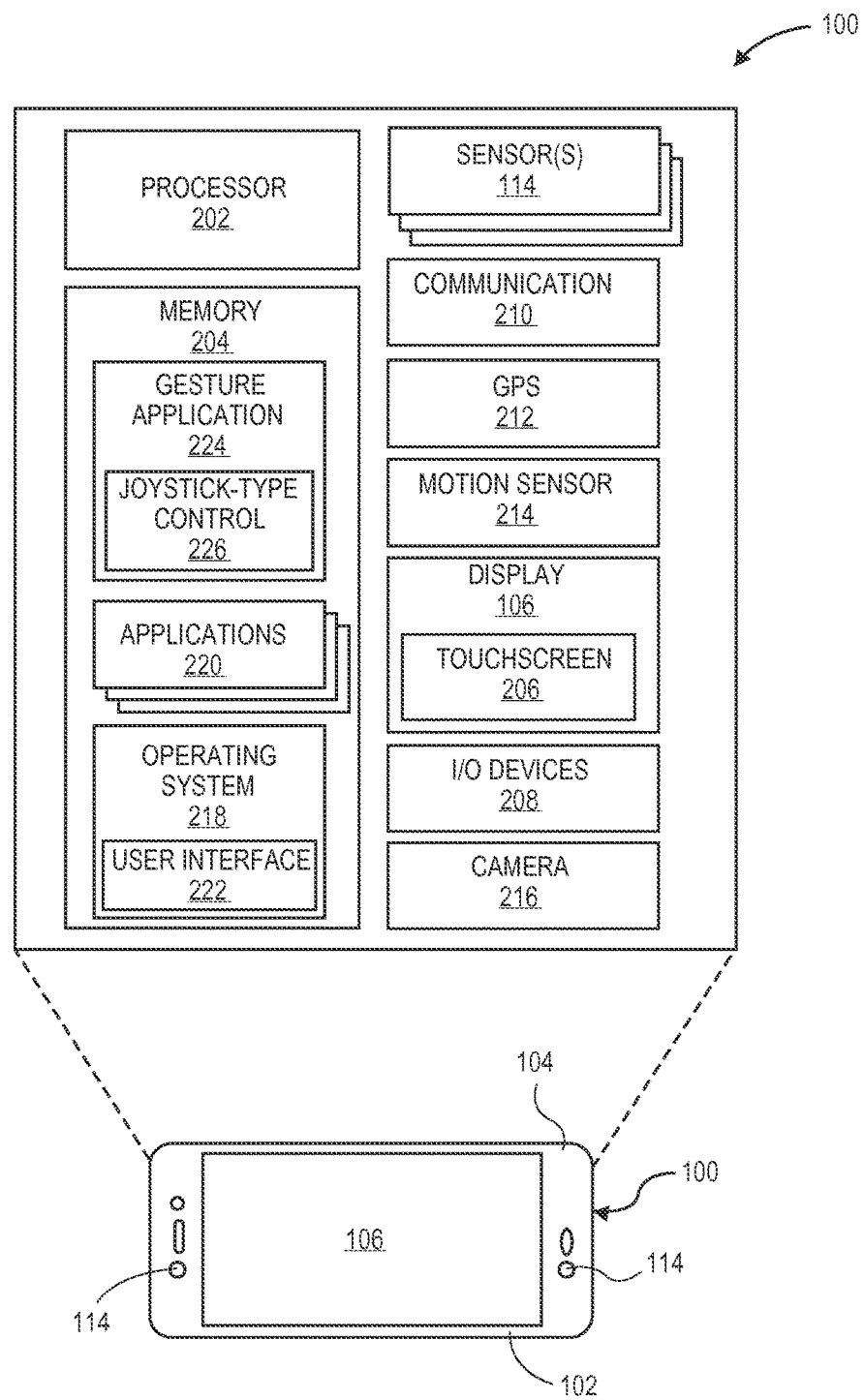
FIG. 2A is a block diagram illustrating components of a representative electronic device, such as the portable electronic device shown in FIG. 1A.

FIG. 2A illustrates a representative electronic device 100, such as the electronic device 100 shown in FIGS. 1A and 1B, which is operable to perform techniques discussed herein. As noted above, the electronic device 100 may be configured in a variety of ways. For instance, the electronic device 100 may be configured as a smart phone, a tablet computer, a mobile phone, a laptop computer, a netbook computer, a hand-held portable computer, a personal digital assistant (PDA), a multimedia device, a gaming device, an eReader device, a Smart TV device, a surface computing device (e.g., a table top computer), a Human Interface Device (HID), combinations thereof, and so forth. However, these devices are provided by way of example only and are not meant to be restrictive of the present disclosure. Thus, the electronic device 100 may be configured as various other devices, which may include a hands-free human interface.

In FIG. 2A, the electronic device 100 is illustrated as including a processor 202 and a memory 204. The processor 202 provides processing functionality for the electronic device 100 and may include any number of processors, micro-controllers, or other processing systems and resident or external memory for storing data and other information accessed or generated by the electronic device 100. The processor 202 may execute one or more software programs which implement the techniques and modules described herein. The processor 202 is not limited by the materials from which it is formed or the processing mechanisms employed therein and, as such, may be implemented via semiconductor(s) and/or transistors (e.g., electronic Integrated Circuits (ICs)), and so forth.

The memory 204 is an example of non-transitory device-readable storage media that provides storage functionality to store various data associated with the operation of the electronic device 100, such as the software program and code segments mentioned above, or other data to instruct the processor 202 and other elements of the electronic device 100 to perform the techniques described herein. Although a single memory 204 is shown, a wide variety of types and combinations of memory may be employed. The memory 204 may be integral with the processor 202, stand-alone memory, or a combination of both. The memory may include, for example, removable and non-removable memory elements such as Random Access Memory (RAM), Read Only Memory (ROM), Flash memory (e.g., a Secure Digital (SD) card, a mini-SD card, a micro-SD card), magnetic memory, optical memory, Universal Serial Bus (USB) memory devices, and so forth. In embodiments of the electronic device 100, the memory 204 may include removable Integrated Circuit Card (ICC) memory, such as memory provided by Subscriber Identity Module (SIM) cards, Universal Subscriber Identity Module (USIM) cards, Universal Integrated Circuit Cards (UICC), and so on.

As shown in FIG. 2A, and discussed above in the description of FIG. 1A, the electronic device 100 includes one or more sensors 114. In embodiments, the sensors 114 may comprise gesture sensors that are capable of differentiating the direction of movement of a target 116. In embodiments, the gesture sensors 114 are configured to track the position of a target relative to a point of reference (e.g., the center of the sensor 114 itself), instead of detecting motion. By tracking the position of a target 116 relative to the "center" of the sensor, it is possible to emulate, with some quantization, the functionality of a joystick-type device such as a joystick, thumbstick, or "D-Pad" on a gaming controller.

Figure 2B:
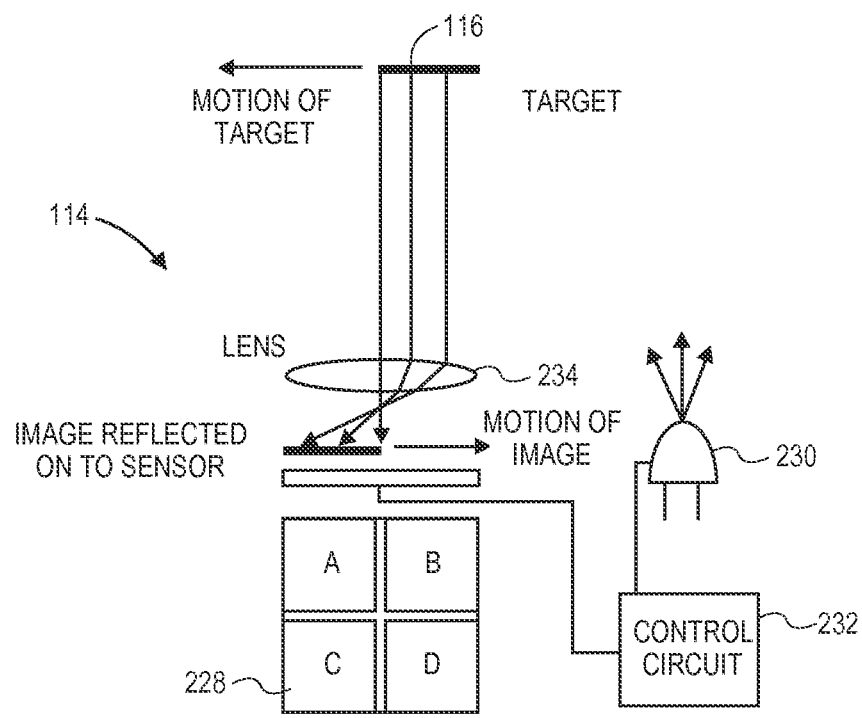
FIG. 2B is a conceptual diagram illustrating a sensor that may be employed by the portable electronic device of FIG. 2A in accordance with an example implementation of the present disclosure.

In embodiments, as shown in FIG. 2B, respective ones of the sensors 114 may employ a photosensor/photodetector array 228. The photosensor/photodetector array 228 may be configured in a variety of ways. For example, the photosensor/photodetector array 228 may comprise an array of photosensor diodes (e.g., photodiodes), phototransistors, and so forth. In embodiments, the sensors are configured to light reflected off a target to determine the target's position. In the previous example, a source of light such as illumination source 230 can be associated with the sensor 114 or another sensor 114. In implementations, the sensors 114 are capable of detecting light and providing a signal in response thereto. Thus, a sensor 114 may provide a signal corresponding to the light intensity incident upon each photodetector within the array 228 by converting light into current and/or voltage based upon the intensity of the detected light, which is then processed by a control circuit 232 to furnish an output that may be interpreted by the processor 202 of the electronic device 100 to furnish control inputs to applications executed by the processor 202. For example, when the sensor 114 is exposed to light, multiple free electrons may be generated in the photosensor/photodetector array 228 to create a signal comprised of electrical current. The signal may correspond to one or more characteristics of the detected light. For example, the characteristics may correspond to, but are not necessarily limited to: the position of the detected light with respect to the sensor 114, the intensity (e.g., irradiance, etc.) of the light incident upon the sensor 114, how long the light is incident on the sensor 114, an orientation of the light incident upon the sensor 114, and so forth.

The sensors 114 can be configured to detect light in one or both of the visible light spectrum and the near infrared light spectrum. As used herein, the term "light" is used to refer to electromagnetic radiation occurring in the visible light spectrum and/or the near infrared light spectrum. For instance, as referenced herein, the visible light spectrum (visible light) includes electromagnetic radiation occurring in the range of wavelengths from about three hundred ninety nanometers (390 nm) to approximately seven hundred fifty nanometers (750 nm). Similarly, as referenced herein, the near infrared light spectrum (infrared light) includes electromagnetic radiation that ranges in wavelength from about seven hundred nanometers (700 nm) to three microns (3 μm). In implementations, Complementary Metal-Oxide-Semiconductor (CMOS) fabrication techniques are used to form the photodetector arrays 228 of the sensors 114.

In implementations, respective ones of the sensors 114 are configured to detect gestures in multiple orientations with respect to the orientation of the sensor 114 (e.g., right-to-left, left-to-right, top-to-bottom, bottom-to-top, diagonally across the photodetector, etc.). Thus, the sensor 114 may comprise a multisegmented sensor (e.g., a sensor employing a segmented photodetector array 228 that includes an array of individual photodetectors provided in a single package). The sensor 114 may include a lens 234 configured to focus and transmit the light incident on the photodetector array 228. For example, as a target 116 (e.g., an object such as a finger of a user's hand) passes through the field of view of the segmented photodetector array 228, the target reflects light. The lens 234 is configured to collimate the light incident upon the lens 234. The collimated light is then furnished to the photodetectors where each individual photodetector may provide a signal that is out of phase with the other photodetectors of the segmented photodetector array 228 as the target passes over the respective individual photodetectors.

Figure 2C:
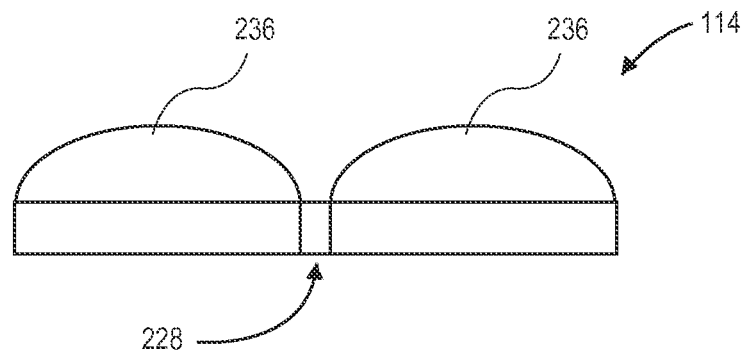
FIG. 2C is a diagrammatic side elevation view illustrating a sensor having a microlens disposed over one or more photodiodes of the sensor in accordance with an example implementation of the present disclosure.

In one or more implementations of the present disclosure, as shown in FIG. 2C, the sensor 114 may include a photodetector array 228 that employs one or more microlens 236 which are disposed on the photodetector array 228 over one or more of the photodetectors. The microlens 236 are configured to focus and to transmit light (e.g., electromagnetic radiation) incident thereon to one or more of the photodetectors. In embodiments, a microlens 236 may be coupled with (e.g., disposed over) a single photodetector to collimate light incident on the microlens 236 onto the photodetector. In other embodiments, a microlens 236 may be coupled with (e.g., disposed over) multiple photodetectors to collimate light incident on the microlens 236 onto the photodetectors. In one or more implementations, the microlens 236 may be a glass lens, a plastic lens, a spherical lens, an aspherical lens, a Fresnel-type lens, or the like.

Representative multisegmented sensors 114 suitable for use in implementation of the techniques discussed herein are disclosed in U.S. Published Patent Application No. 2012/0280107, entitled, OPTICAL GESTURE SENSOR USING A SINGLE ILLUMINATION SOURCE and/or U.S. patent application Ser. No. 14/048,219, entitled, GESTURE SENSING DEVICE, which are herein incorporated by reference in their entireties.

While the sensors 114 have been described with some specificity as including a number of photodiodes arranged in an array, these configurations are provided by way of example only and are not meant to be restrictive of the present disclosure. Thus, sensors 114 in accordance with the present disclosure may include, but are not necessarily limited to: an active pixel sensor (e.g., an image sensor including an array of pixel sensors, where each pixel sensor is comprised of a light sensor and an active amplifier); a Charge-Coupled Device (CCD); a Light-Emitting Diode (LED) reverse-biased to act as a photodiode; an optical detector that responds to the heating effect of incoming radiation, such as a pyroelectric detector, a Golay cell, a thermocouple, and/or a thermistor; a photoresistor/Light Dependent Resistor (LDR); a photovoltaic cell; a photodiode (e.g., operating in photovoltaic mode or photoconductive mode); a photomultiplier tube; a phototube; a phototransistor; and so forth. Further, the sensors 114 described are provided by way of example only and other sensors can be used to detect gestural motions, including a proximity sensor that emits a beam of electromagnetic radiation (e.g., infrared light), and so forth.

As shown in FIG. 2B, the sensors 114 may include (or operate in cooperation with) an illumination source 230 configured to generate light (e.g., near infrared light and/or visible light) within a limited spectrum of wavelengths. The illumination source 230 may be used to illuminate an object proximal to the electronic device 100, such as the target 116, allowing the photodetector array 228 of the sensor 114 to more easily and/or accurately detect the object. In an implementation, the photodetector array 228 of the sensors 114 is configured to detect light (e.g., light reflected from an object proximate to the device 100) generated and emitted from the illumination source 230. Thus, the photodetector array 228 may be configured to detect light within a limited spectrum of wavelengths. For example, the illumination source 230 may generate a light occurring in a first spectrum of wavelengths, and the photodetector array 228 may be configured to detect light only occurring within the first spectrum of wavelengths. In implementations, the illumination source 230 may comprise a light emitting diode (LED), a laser diode, a vertical cavity surface-emitting laser (VCSEL), or another type of light source. Although a sensor 114 can detect reflected light from an illumination source 230 associated with the sensor, in additional embodiments, a first sensor 114 may detect light from an illumination source 230 associated with another sensor 114.

It should be noted that, for the purposes of the present disclosure, the term "light," when used with "detect," "sense," "convert," "determine," and so forth, should not be construed as limited to the detection or conversion of the presence or absence of light (e.g., above or below a particular threshold), or to detecting or converting a spectrum of wavelengths to a single measurement representative of overall light intensity (e.g., irradiance) within the spectrum. Thus, the detection and/or conversion of the presence of light, within the context of the present disclosure, may be used to refer to detecting and/or converting the presence or absence of light (e.g., above or below a particular threshold), detecting and/or converting a spectrum of wavelengths to a single measurement representative of overall light intensity within the spectrum, as well as to detecting and/or converting multiple frequencies within a range of possible frequencies, such as detecting and/or converting intensities of radiation separately in two or more subsets of wavelengths within a spectrum, as well as for individual frequencies, such as colors of light, and so forth.

As noted, the electronic device 100 includes a display 106 to display information to a user of the electronic device 100. In embodiments, the display 106 may comprise an LCD (Liquid Crystal Diode) display, a TFT (Thin Film Transistor) LCD display, an LEP (Light Emitting Polymer) or PLED (Polymer Light Emitting Diode) display, an OLED (Organic Light Emitting Diode) display, and so forth, which may be configured to display text and/or graphical information, such as a graphical user interface, and so forth. The display 106 can be backlit via a backlight so it can be viewed in the dark or other low-light environments.

As shown in FIG. 2A, the display 106 can be provided with a touchscreen 206 that overlays the display area for entry of data and commands. In embodiments, the touch screen 206 can comprise a capacitive touchscreen, a resistive touchscreen, a surface acoustic wave touchscreen, an infrared touchscreen, optical imaging touchscreens, dispersive signal touchscreens, acoustic pulse recognition touchscreens, combinations thereof, and the like. Capacitive touchscreens can include surface capacitance touchscreens, projected capacitance touchscreens, mutual capacitance touchscreens, and self-capacitance touchscreens. In implementations, the touchscreen 206 is configured with hardware to generate a signal to send to a processor and/or driver upon detection of a touch input and/or a hover input. As indicated herein, touch inputs include inputs, gestures, and movements where the input (e.g., a finger of the user) contacts the screen 206. Hover inputs include inputs, gestures, and movements where the input does not contact the screen 206, but are detected proximal to the screen 206.

The electronic device 100 may further include one or more Input/Output (I/O) devices 208 (e.g., buttons, a keypad, and so on). In an implementation, the sensors 114 may be configured as a further I/O device 208. For example, one or more of the sensors 114 may detect light representing gestures corresponding to a desired operation associated with the electronic device 100. Additionally, the I/O devices 208 may comprise one or more audio I/O devices, such as a microphone, speakers, and so on.

The electronic device 100 may include a communication module 210, representative of communication functionality, to permit electronic device 100 to send/receive data between different devices (e.g., components/peripherals) and/or over one or more networks. Communication module 210 may be representative of a variety of communication components and functionality including, but not necessarily limited to: an antenna; a browser; a transmitter and/or a receiver; a wireless radio; a data port; a software interface and/or a driver; a networking interface; a data processing component; and so forth. The one or more networks 318 are representative of a variety of different communication pathways and network connections which may be employed, individually or in combination, to communicate among the components of the electronic device 100. Thus, the one or more networks 318 may be representative of communication pathways achieved using a single network or multiple networks. Further, the one or more networks 318 are representative of a variety of different types of networks and connections that are contemplated, including, but not necessarily limited to: the Internet; an intranet; a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; a 3G network; a 4G network; an LTE network, and so on. Wired communications are also contemplated such as through USB, Ethernet, serial connections, and so forth. The electronic device 100, through functionality represented by the communication module 210, may be configured to communicate via one or more networks to receive various content from one or more content repositories (e.g., an Internet provider, a cellular data provider, etc.). A variety of content may be communicated, examples of which include, but are not necessarily limited to: web pages; gaming applications, applications, services; music; photographs; video; email service; instant messaging; device drivers; instruction updates; and so forth.

The portable electronic device 100 is further illustrated as including functionality to determine position. For example, the mobile electronic device 100 can receive signal data transmitted by one or more position data platforms and/or position data transmitters, examples of which include the Global Positioning System (GPS) satellites. More particularly, the portable electronic device 100 can include a GPS module 212 that can manage and process signal data received from GPS satellites via a GPS receiver. The position-determining module 212 is representative of functionality operable to determine a geographic position through processing of the received signal data. The signal data can include various data suitable for use in position determination, such as timing signals, ranging signals, ephemerides, almanacs, and so forth.

The GPS module 212 can also be configured to provide a variety of other position-determining functionality. Position-determining functionality, for purposes of discussion herein, can relate to a variety of different navigation techniques and other techniques that can be supported by "knowing" one or more positions. For instance, position-determining functionality can be employed to provide position/location information, timing information, speed information, and a variety of other navigation-related data. Accordingly, the GPS module 212 can be configured in a variety of ways to perform a wide variety of functions. For example, the GPS module 212 can be configured for outdoor navigation, vehicle navigation, aerial navigation (e.g., for airplanes, helicopters), marine navigation, personal use (e.g., as a part of fitness-related equipment), and so forth. Accordingly, the GPS module 212 can include a variety of devices to determine position using one or more of the techniques previously described.

The GPS module 112, for instance, can use signal data received via the GPS receiver in combination with map data that is stored in the memory 204 to generate navigation instructions (e.g., turn-by-turn instructions to an input destination or Point of Interest (POI)), show a current position on a map, and so on. The GPS module 212 can include one or more antennas to receive signal data as well as to perform other communications, such as communication via one or more networks described in more detail above. The GPS module 212 can also provide other position-determining functionality, such as to determine an average speed, calculate an arrival time, and so on.

Although a GPS system is described and illustrated in relation to FIG. 2A, it should be apparent that a wide variety of other positioning systems can also be employed, such as other global navigation satellite systems (GNSS), terrestrial based systems (e.g., wireless phone-based systems that broadcast position data from cellular towers), wireless networks that transmit positioning signals, and so on. For example, positioning-determining functionality can be implemented through the use of a server in a server-based architecture, from a ground-based infrastructure, through one or more sensors (e.g., gyros, odometers, and magnetometers), use of "dead reckoning" techniques, and so on.

The portable electronic device 100 can further include a motion sensor module 214 that represents functionality to determine various manual manipulation of the device 100. The motion sensor module 214 can be configured in a variety of ways to provide signals to enable detection of different manual manipulation of the portable electronic device 100, including detecting orientation, motion, speed, impact, and so forth. For example, the motion sensor module 214 is representative of various components used alone or in combination, such as an accelerometer, gyroscope, velocimeter, capacitive or resistive touch sensor, and so on.

The portable electronic device 102 can include an integrated camera 216 that is configured to capture media such as still photographs and/or video by digitally recording images using an electronic image sensor. Media captured by the camera 216 can be stored as digital image files in memory 106 and/or sent to a processor for interpretation. In embodiments, the digital image files can be stored using a variety of file formats. For example, digital photographs can be stored using a Joint Photography Experts Group standard (JPEG) file format. Other digital image file formats include Tagged Image File Format (TIFF), Raw data formats, and so on. Digital video can be stored using a Motion Picture Experts Group (MPEG) file format, an Audio Video Interleave (AVI) file format, a Digital Video (DV) file format, a Windows Media Video (WMV) format, and so forth. Exchangeable image file format (Exif) data can be included with digital image files to provide metadata about the image media. For example, Exif data can include the date and time the image media was captured, the location where the media was captured, and the like. Digital image media can be displayed by the display 106 and/or transmitted to other devices via a network (e.g., via an email or MMS text message).

The electronic device 100 may employ an operating system 218, which is storable in memory 204 and executable by the processor 202. The operating system 218 is representative of functionality to control operation of the electronic device 100 and facilitate execution of applications 220 by the processor 202. The applications 220 may comprise software storable in memory 204 and executable by the processor 202, e.g., to perform a specific operation or group of operations to furnish functionality to the electronic device 100. Example applications include cellular telephone applications, instant messaging applications, email applications, gaming applications, navigation/map applications, and so forth.

The operating system includes a user interface 222. The user interface 222 is representative of functionality to control the display of information and data to the user of the electronic device 100 via the display 106. In some implementations, the display 106 may not be included as a part of the electronic device 100 and may instead be connected externally using USB, Ethernet, serial connections, and so forth. The user interface 222 may provide functionality to allow the user to interact with one or more applications 220 of the electronic device 100 by providing inputs via the I/O devices 208. For example, the user interface 222 may cause an Application Programming Interface (API) to be generated to expose functionality to an application 220 to configure the application for display by the display 106, or in combination with another display. In embodiments, the API may further expose functionality to configure the application 220 to allow a user to interact with an application by providing inputs via the I/O devices 208. For example, a user may provide hand gestures proximate to the sensors 114 corresponding to a desired operation associated with an application 220. For instance, as discussed herein below, a user may use a thumb of his/her hand to perform touchless joystick operations over a sensor 114 to control indicia (e.g., a gaming character) displayed via the display 106 by a gaming application 220; may perform a finger swipe proximate to the sensor 114 to transition between various display pages showing various applications 220 within the display 106; and so forth.

As shown in FIG. 2A, the electronic device 100 may include a gesture recognition module 224. In the illustrated embodiment, the gesture recognition module 224 is depicted as a software application that is storable in memory 204 and executable by the processor 202. However, it is contemplated that the gesture recognition module 224 or portions thereof, can be implemented using software, firmware, hardware (e.g., fixed logic circuitry), manual processing, or a combination of these implementations. The gesture recognition module 224 represents functionality to track and/or to recognize an attribute such as a gesture performed within the field-of-view of one or more of the sensors 114. The gesture recognition module 224 is also configured to recognize the type of gesture performed.

As discussed herein, the sensors 114 are configured to detect a target 116 (e.g., a thumb 118 or a finger 120 of a hand of a user of the electronic device 100) at a distance from the sensor 114 and provide a signal in response thereto. The gesture recognition module 224 includes functionality to determine the position of the target 116 relative to a point of reference based on the signal. In embodiments, the point of reference may comprise a center of the sensor 114, as shown in FIG. 1A. However, the point of reference may be any chosen point of reference. For example, it is contemplated that the point of reference may be other points on the face of the sensor, other points on or within the housing 102 (e.g., on the front surface 104, back surface 106, sides 110, or ends 112) of the portable electronic device 100, a point in space proximal to the portable electronic device 100, and so forth. The point of reference for a sensor may vary based on whether it is synchronized with another sensor. For example, a center of a sensor may be used when the sensor is operating independently, while a mid-point between two sensors is used when the sensors is operating with another sensor.

The gesture recognition module 224 may further include functionality to track motion of the target 116 (e.g., a thumb 118 or a finger 120 of a user's hand) based on changes in the determined position relative to the point of reference. In embodiments, motion of a target 116 may be tracked in two dimensions (e.g., parallel to the front surface 104, back surface 108, sides 110, or ends 112 of the housing 102 of the portable electronic device 100 (FIG. 1A)), or in three dimensions (e.g., parallel and/or perpendicular to the front surface 104, back surface 108, sides 110, or ends 112 of the housing 102).

In embodiments, the gesture recognition module 224 includes functionality to synchronize one or more of the sensors 114 shown in FIG. 1A with others of the sensors 114 to allow one sensor 114 to receive data from another sensor 114. This synchronization may be used to augment the position and/or motion detection functionality (and generation of the joystick control input) by adding functionality such as stereoscopy or triangulation to improve the overall performance of the device 100. In further embodiments, different functions are accessed depending on whether the sensors are synchronized.

In embodiments, the gesture recognition module 224 employs synchronization to implement a touchless optical mouse input, with the target being a touchless variant of a mouse cursor displayed by the display 106. When coupled with a secondary touchless joystick control input, as described below, this touchless optical mouse input can be used to emulate a "WASD+mouse" input, which may be provided to and used by one or more of the applications 220 (e.g., a gaming application).

The electronic device 100 may include a joystick-type control module 226. The joystick-type control module 226, which in embodiments may be part of the gesture recognition module 224 (or which may be a separate module), includes functionality to cause the determined position of the target 116, which may be a thumb 118 or a finger 120 of a hand of a user of the electronic device 100, to be processed to furnish a touchless joystick control input (e.g., one of a D-pad control input or a joystick control input) to the operating system 218, user interface 222, and/or other applications 220 of the electronic device 100, which may be executed by the processor 202 of the electronic device 100. In embodiments, such as the embodiment illustrated in FIG. 1A, sensors 114 are positioned proximate to the ends 112 of the housing 102 on either side of the display 106.

In embodiments, the joystick-type control module 226 may include functionality to furnish, in combination with the configuration of sensors 114 described in the discussion of FIG. 1B, touchless joystick control inputs used in tandem with swipe-based gesture sensor inputs (e.g., swipe up/across, pinch, etc.) which may be furnished by the gesture recognition module 224. For example, the joystick-type control module 226 represents functionality that causes one sensor 114 to detect the position of a first target 116 (e.g., a thumb 118 of the hand of a user used to furnish a joystick input) while the gesture recognition module 224 represents functionality that detects the motion of a second target (e.g., a finger 120 of the hand of a user used to furnish a hand swipe). These inputs may be, but need not be, concurrent, and the sensor 114 may be configured to switch between two operating modes based upon either a user command or based upon the context of the input.

In this manner, differentiation of gestures based upon actions performed over one sensor versus actions performed over multiple sensors may be furnished. For example, a gesture performed over (across) a first (e.g., left or bottom) sensor 114 only can be interpreted differently by the gesture recognition module 224 from the same gesture performed over (across) a second (e.g., right or top) sensor 114, or both sensors 114. Moreover, differentiation of gestures by the gesture recognition module 224 can be combined with tandem usage of swipe gestures and position tracking (e.g., to furnish joystick control inputs) into complex gestures.

In the illustrated embodiment, the joystick-type control module 226 is depicted as a software application that is storable in memory 204 and executable by the processor 202. However, it is contemplated that the joystick-type control module 226 or portions thereof, can be implemented using software, firmware, hardware (e.g., fixed logic circuitry), manual processing, or a combination of these implementations.

As noted, in embodiments, the sensors 114 may comprise a multisegmented proximity sensors or gesture sensors that are capable of differentiating the direction of a signal. The joystick-type control module 226 provides functionality to track the position of the target 116 (e.g., a thumb 118 or a finger 120 of a hand of a user of the electronic device 100). As noted, the joystick-type control module 226 may furnish functionality to track the position of the target 116 relative to a point of reference such as the center of a sensor 114 (e.g., a point on the outer face of a sensor 114 at the center).

Figure 3:
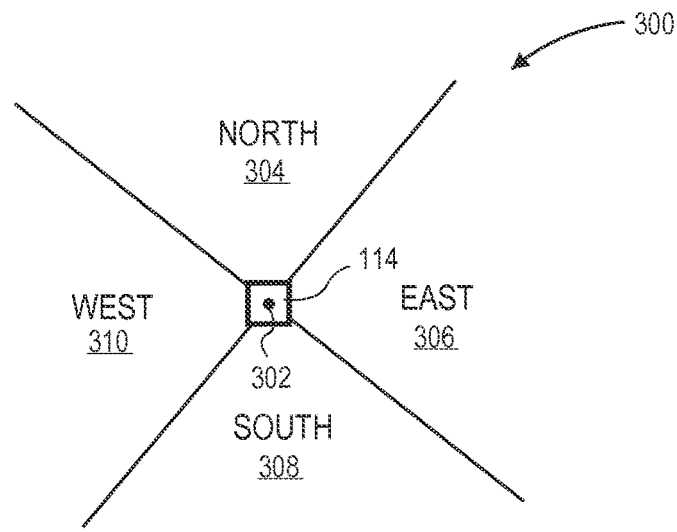
FIG. 3 is a diagrammatic top plan illustration depicting the volume of space over a sensor of the electronic device shown in FIGS. 1 and 2, wherein the volume is divided into quadrants located at cardinal directions with respect to the center of the sensor.
Figure 4:
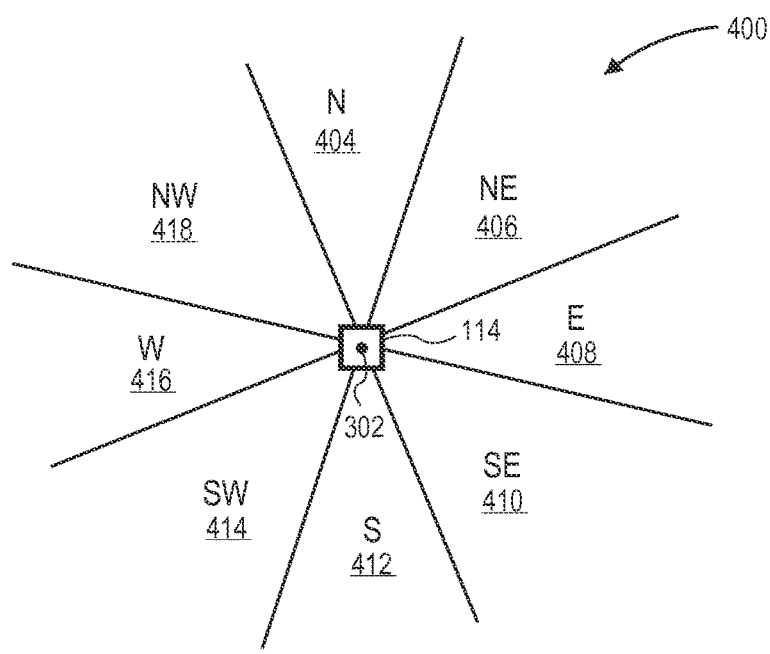
FIG. 4 is a diagrammatic top plan illustration depicting the volume of space over a sensor of the electronic device shown in FIGS. 1 and 2, wherein the volume is divided into eight regions located at cardinal and ordinal directions with respect to the center of the sensor.

In embodiments, the volume of space over one or more sensors 114 is divided into at least two distinct regions. For example, in embodiments, a volume of space over a sensor 114 is divided into a number (N) of distinct regions, wherein N is the number of unique directional channels in the sensor. FIG. 3 illustrates an example volume of space 300 over a sensor 114 of the electronic device 100 shown in FIGS. 1 and 2, wherein the volume 300 is divided into four (4) regions. In the embodiment shown, the four regions comprise quadrants located at cardinal directions with respect to the center 302 of the sensor 114 (e.g., a North region 304, an East Region 306, a South region 308, and a West region 310). In other embodiments, the volume of space may have twice the number (2N) distinct regions, with the extra regions being defined as the overlaps of two neighboring regions. FIG. 4 illustrates an example volume of space 400 over a sensor 114 of the electronic device 100 shown in FIGS. 1 and 2, wherein the volume 400 is divided into eight (8) regions. In the embodiment shown, the eight regions comprise octants located at cardinal directions with respect to the center 402 of the sensor 114 (e.g., a North region 404, a Northeast region 406, an East Region 408, a Southeast region 410, a South region 412, a Southwest region 414, a West region 416, and a Northwest region 418). In further embodiments, the volume of space over a one-dimensional sensor may be divided into only two regions such as, for example: East and West or North and South.

Figure 5:
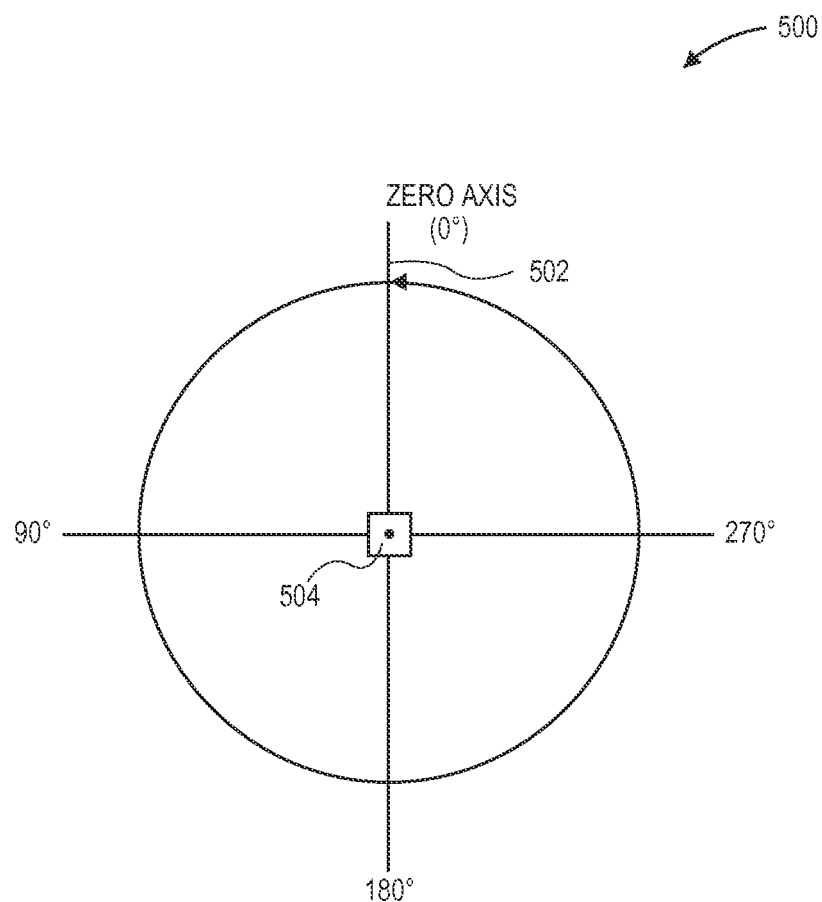
FIG. 5 is a diagrammatic top plan illustration depicting the volume of space over a sensor of the electronic device shown in FIGS. 1 and 2, wherein the position of the target is determined relative to a zero axis defined with respect to the center of the sensor.

In embodiments, the position of the target 116 can be determined relative to a zero axis defined with respect to the center of the sensor 114. FIGS. 3, 4, and 5 show each embodiment, respectively. FIG. 5 illustrates an example volume of space 500 over a sensor 114 of the electronic device 100 shown in FIGS. 1 and 2, wherein the position of the target 114 is determined relative to a zero axis 502 defined with respect to the center 504 of the sensor 114. For example, a polar coordinate system may be defined where the zero axis is positioned at an angle of zero (0) degrees with angles measured counterclockwise (e.g., ninety (90) degrees, one hundred eighty (180), two hundred seventy (270) degrees, and so on.

The joystick-type control module 226 includes functionality to determine the position of the target 116 by determining that the target 116 is positioned in a first region of the at least two regions based on the signal received from one or more of the sensors 114. The joystick-type control module 226 may further include functionality to track movement of the target 116 based on determining that the target 116 is moved from the first region to a second region of the at least two regions based on the signal received from one or more of the sensors 114. Thus, one or more sensors 114 may track the position of a target 116, emulating the function of a joystick-type input device on a conventional gaming controller. In this manner, a user can manipulate his/her finger or thumb as if he/she was operating a joystick, but without physically contacting the sensor.

For example, a sensor 114 may detect the presence of a user's thumb positioned in the East Region 306 of the volume of space 300 over the sensor 114 as shown in FIG. 3 and output a signal characteristic of the detection of a target 116 in this position. The joystick-type control module 226 may process the signal and furnish a signal (e.g., to an application 220, the operating system 218, etc.) that is equivalent to a thumbstick or D-pad controller being pulled to the right.

Similarly, a sensor 114 may detect the presence of a user's thumb positioned in the Southwest Region 414 of the volume of space 400 over the sensor 114 as shown in FIG. 4 and output a signal characteristic of the detection of a target 116 in this position. The joystick-type control module 226 may process the signal and furnish a signal (e.g., to an application 220, the operating system 218, etc.) that is equivalent to a thumbstick being pulled to the bottom-left.

In a further example, a sensor 114 may detect the presence of a user's thumb as a continuous position with respect to the center 502 of the sensor 114, with the position of the target being reported as an angle relative to a zero axis 504 as shown in FIG. 5. In this manner, the distance of the target from the point of reference (the center 502 of the sensor 114) may be distinguished, allowing for granularity in the position determination by the joystick-type control module 226 such as how far the "joystick" or "thumbstick" is "pulled."

The outputs of the gesture recognition module 224 and/or the joystick-type control module 226, as described herein can be used in conjunction with the sensors 114 to furnish touchless control inputs for a variety of applications 220 that may be implemented by the electronic device (e.g., stored in memory 204 and executed by processor 202). For example, as discussed, the gesture recognition module 224 and/or the joystick-type control module 226 can provide control inputs that simulate one-dimensional (1D) controls such as a button or switch, two-dimensional (2D) controls such as a D-pad controller or thumbstick, three-dimensional (3D) controls such as a clickable thumbstick to a gaming application for manipulation or control of indicia that is caused to be displayed by the application 220. In embodiments, such gaming applications may employ other inputs such as touch inputs from the touchscreen 206, inputs from I/O devices 206, orientation/tilt/motion inputs from the motion sensor module 214, and so forth which may be used in conjunction with the control inputs furnished by the gesture recognition module 224 and/or the joystick-type control module 226 to furnish integrated control of the gaming environment. However, it should be recognized that the control inputs furnished by the gesture recognition module 224 and/or the joystick-type control module 226 can be used by a variety of applications 220 (which are not necessarily gaming applications 220). For example, the gesture recognition module 224 and/or the joystick-type control module 226 can provide control inputs for manipulating a map or moving map that is caused to be displayed by a navigation or mapping application 220 which may also employ location/position information received from the GPS module 212, communication module 210 and so forth. Similarly, the gesture recognition module 224 and/or the joystick-type control module 226 can provide control inputs for manipulating the user interface 222 of the operating system 218, to for example, place/receive telephone calls, send/receive text messages, manipulate (send/receive/organize) email, manipulate Internet content (e.g., webpages and other content), control camera applications that control operation of the camera 216 (e.g., control zoom, focus, edit, tag, etc.), edit documents/spreadsheets/databases, manipulate content such as audio or video content stored in memory 204 (e.g., stored music, movies, audiobooks, etc.) or received via the communication module 210 (streamed music, movies, audiobooks, etc.), and so forth. A variety of other applications are possible.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the electronic device 100 of FIG. 2A can be wired, wireless, or some combination thereof. In the case of a software implementation, for instance, the modules represent executable instructions that perform specified tasks when executed on a processor, such as the processor 202 of the electronic device 100 of FIG. 2. The software (program code) can be stored in one or more tangible device-readable storage media, an example of which is the memory 204 associated with the electronic device 100 of FIG. 2.

Example Methods

The following discussion describes methods that may be implemented in an electronic device for furnishing a touchless joystick-type controller. Aspects of the methods may be implemented in hardware, firmware, or software, or a combination thereof. The methods are shown as a set of blocks that specify operations performed by one or more devices and are not necessarily limited to the orders shown for performing the operations by the respective blocks. In portions of the following discussion, reference may be made to the electronic device 100 of FIGS. 1A, 1B, 2A, 2B, and 2C. The features of techniques described below are platform-independent, meaning that the techniques may be implemented on a variety of commercial electronic device platforms having a variety of processors.

Figure 6:
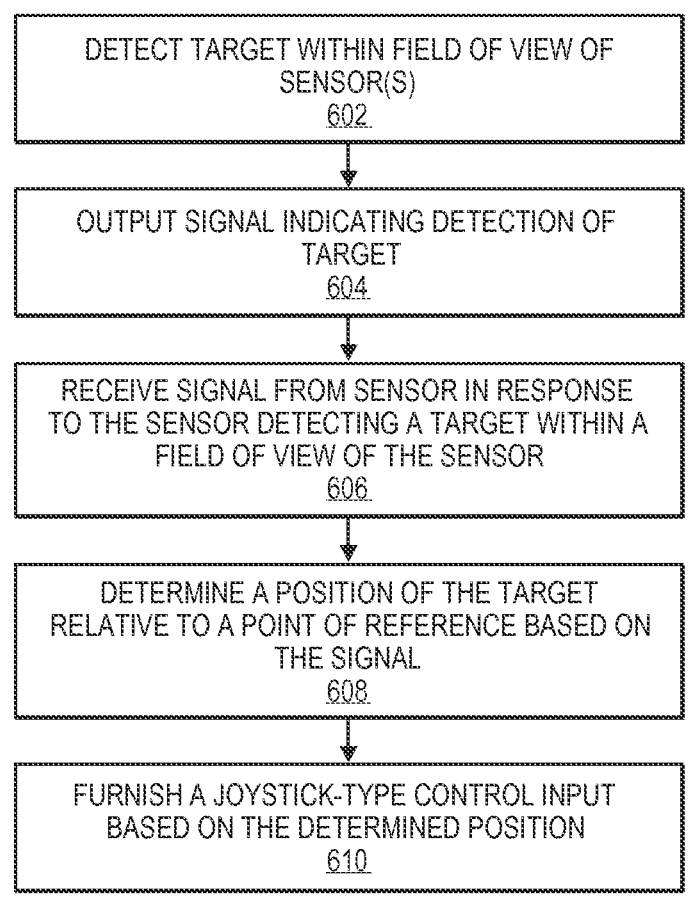
FIG. 6 is a flow diagram illustrating a method, that may be implemented in a portable electronic device such as the electronic devices illustrated in FIGS. 1 and 2, to furnish a touchless joystick-type controller in accordance with example implementations of the present disclosure.

FIG. 6 depicts a method that may be implemented in a portable electronic device such as the electronic devices 100 illustrated in FIGS. 1A and 2A, to furnish a touchless joystick-type controller in accordance with example implementations of the present disclosure. As shown in FIG. 6, a target (e.g., a thumb or a finger of a hand of a user of the electronic device) is detected within the field of view of one or more sensor(s) of a portable electronic device (Block 602). In response to detection of the target, the sensor(s) output signals indicating the detection of the target (Block 604). For example, as described in the discussion of the electronic devices 100 illustrated in FIGS. 1A, 1B, 2A, 2B, and 2C, the sensors 114 are configured to detect a target 116 (e.g., a thumb 118 or a finger 120 of a hand of a user of the electronic device 100) at a distance from the sensor 114 and provide one or more signals in response thereto. Respective ones of the sensors 114 may comprise a multisegmented sensor (e.g., a sensor employing a segmented photodetector array that includes an array of individual photodetectors provided in a single package).

The signal from the sensor, in response to the sensor detecting a target within a field of view of the sensor, is received (Block 606) and processed to determine a position of the target relative to a point of reference based on the signal (Block 608). For example, as described in the discussion of FIGS. 1A, 1B, 2A, 2B, and 2C, a position of the target 116 relative to a point of reference (e.g., the center of a sensor 114) is then determined based on the signal. Motion of the target 116 may be tracked based on changes in the determined position relative to the point of reference.

In embodiments, the volume of space over one or more sensors 114 is divided into at least two distinct regions. For example, in the embodiment shown in FIG. 3, a volume of space over a sensor 114 is divided into a number (N) of distinct regions, wherein N is the number of unique directional channels in the sensor. In other embodiments, as shown in FIG. 4, the volume of space may have twice the number (2N) distinct regions, with the extra regions being defined as the overlaps of two neighboring regions. In further embodiments, the volume of space over a one-dimensional sensor may be divided into only two regions such as, for example: East and West or North and South. In additional embodiments, the position of the target 114 can also be determined relative to a zero axis defined with respect to the center of the sensor. The position of the target 116 may be ascertained by determining that the target 116 is positioned in a first region of the at least two regions based on the signal received from one or more of the sensors 114.

A joystick-type control input may then be provided based on the determined position (Block 610). For example, a sensor 114 may detect the presence of a user's thumb positioned in the West Region 310 of the volume of space 300 over the sensor 114 as shown in FIG. 3 and output a signal characteristic of the detection of a target 116 in this position. The signal may be processed to furnish a signal (e.g., to an application 220, the operating system 218, etc.) that is equivalent to a thumbstick or D-pad controller being pulled to the left. Similarly, a sensor 114 may detect the presence of a user's thumb positioned in the Northeast Region 406 of the volume of space 400 over the sensor 114 as shown in FIG. 4 and output a signal characteristic of the detection of a target 116 in this position. The signal may be processed to furnish a signal (e.g., to an application 220, the operating system 218, etc.) that is equivalent to a thumbstick being pulled to the top-right. In a further example, a sensor 114 may detect the presence of a user's thumb as a continuous position with respect to the center 502 of the sensor 114, with the position of the target being reported as an angle relative to a zero axis 504 as shown in FIG. 5. In this manner, the distance of the target from the point of reference (the center 502 of the sensor 114) may be distinguished, allowing for granularity in the position determination by the joystick-type control module 226 such as how far the "joystick" or "thumbstick" is "pulled." This, for example, can permit fine motor control sufficient for use with a gaming application. In embodiments, an attribute is determined based on the position from the sensor signal and a function is provided that corresponds to the attribute, e.g., a gesture.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An electronic device comprising:
    a plurality of sensors configured to detect a target at a distance from the plurality of sensors and provide a signal in response thereto, each sensor of the plurality of sensors comprising an array of photosensors;
    a memory operable to store one or more modules; and
    a processor operable to execute the one or more modules to determine a position of the target relative to a point of reference based on the signal, the signal corresponding to light intensity incident upon each photosensor of the array of photosensors,
    wherein the point of reference is defined with respect to plurality of sensors, wherein a volume of space over the plurality of sensors is divided into at least two regions based upon the point of reference, wherein each sensor of the plurality of sensors is synchronized with respective sensors of the plurality of sensors, wherein each synchronized sensor is configured to receive data from another synchronized sensor, the data representing the light intensity incident upon the respective synchronized sensor.

2. The electronic device as recited in claim 1, wherein the target comprises a thumb or a finger of a hand of a user of the electronic device.

3. The electronic device as recited in claim 2, wherein the processor is operable to execute the one or more modules to use the determined position to furnish a joystick-type control input.

4. The electronic device as recited in claim 1, wherein the processor is further operable to execute the one or more modules to track movement of the target based on changes in the determined position relative to the point of reference.

5. The electronic device as recited in claim 1, wherein the processor executes the one or more modules to determine the position of the target by determining that the target is positioned in a first region of the at least two regions based on the signal.

6. The electronic device as recited in claim 5, wherein the processor is further operable to execute the one or more modules to track movement of the target by determining that the target is moved from the first region to a second region based on the signal.

7. The electronic device as recited in claim 1, wherein the volume of space over the plurality of sensors is divided into at least four regions.

8. The electronic device as recited in claim 7, wherein respective ones of the at least four regions comprise quadrants located at cardinal directions with respect to the center of the plurality of sensors.

9. The electronic device as recited in claim 1, wherein the volume of space over the sensor is divided into at least 8 regions.

10. The electronic device as recited in claim 9, wherein respective ones of the at least eight regions are located at cardinal or ordinal directions with respect to the center of the plurality of sensors.

11. The electronic device as recited in claim 1, wherein the position of the target is determined relative to a zero axis defined with respect to the center of the plurality of sensors.

12. The electronic device as recited in claim 1, wherein the processor is operable to execute the one or more modules to determine an attribute based on the determined position relative to the point of reference.

13. The electronic device as recited in claim 12, wherein the attribute comprises at least one of a distance associated with the target, a motion of the target, a direction of the target, acceleration of the target, or a gesture.

14. The electronic device as recited in claim 12, wherein the processor is further operable to provide a function that corresponds to the attribute.

15. The electronic device as recited in claim 1, wherein the plurality of sensors are positioned adjacent a display configured to output a visual image from the processor, the plurality of sensors being configured so the target does not substantially interfere with observation of the visual image upon detection of the position.

16. An electronic device comprising:
   a housing;
   a plurality of sensors disposed within the housing, the plurality of sensors configured to detect a target at a distance from the sensor and provide a signal in response thereto, each sensor of the plurality of sensors comprising an array of photosensors; and
   a circuit operable to determine a position of the target relative to a point of reference based on the signal, the signal corresponding to light intensity incident upon each photosensor of the array of photosensors,
   wherein the position of the target is determined relative to a zero axis defined with respect to the center of the array of photosensors and the point of reference comprises a center of the plurality of sensors, wherein a volume of space over the plurality of sensors is divided into at least two regions based upon the point of reference, wherein a position of the target within a region of the at least two regions is measurable by each photosensor of the array of photosensors, wherein each sensor of the plurality of sensors is synchronized with respective sensors of the plurality of sensors, wherein each synchronized sensor is configured to receive data from another synchronized sensor, the data representing the light intensity incident upon the respective synchronized sensor.

17. The electronic device as recited in claim 16, wherein the target comprises a thumb or a finger of a hand of a user of the electronic device.

18. The electronic device as recited in claim 17, wherein the circuit is operable to use the determined position to furnish a joystick-type control input.

19. The electronic device as recited in claim 16, wherein the circuit is further operable to track movement of the target based on changes in the determined position relative to the point of reference.

20. The electronic device as recited in claim 16, wherein the circuit is operable to determine the position of the target by determining that the target is positioned in a first region of the at least two regions based on the signal.

21. The electronic device as recited in claim 20, wherein the circuit is further operable to track movement of the target by determining that the target is moved from the first region to a second region based on the signal.

22. The electronic device as recited in claim 16, wherein the volume of space over the sensor is divided into at least four regions.

23. The electronic device as recited in claim 22, wherein respective ones of the at least four regions comprise quadrants located at cardinal directions with respect to the center of the sensor.

24. The electronic device as recited in claim 16, wherein the volume of space over the sensor is divided into at least 8 regions.

25. The electronic device as recited in claim 16, wherein respective ones of the at least eight regions are located at cardinal or ordinal directions with respect to the center of the plurality of sensors.

26. A method comprising:
   receiving a signal from a sensor in response to the sensor detecting a target within a field of view of the sensor, the sensor configured to detect the target that is a distance over the sensor, the sensor comprising an array of photosensors; and
   determining a position of the target relative to a point of reference based on the signal, the signal corresponding to light intensity incident upon each photosensor of the array of photosensors,
   wherein the position of the target is determined relative to a zero axis defined with respect to the center of the array of photosensors and the point of reference comprises a center of the array of photosensors, wherein a volume of space over the array of photosensors is divided into at least two regions, wherein each sensor of the plurality of sensors is synchronized with respective sensors of the plurality of sensors, wherein each synchronized sensor is configured to receive data from another synchronized sensor, the data representing the light intensity incident upon the respective synchronized sensor.

27. The method as recited in claim 26, wherein the target comprises a thumb or a finger of a user of the electronic device.

28. The method as recited in claim 27, further comprising using the determined position to furnish a joystick-type control input.

29. The method as recited in claim 26, further comprising tracking movement of the target based on changes in the determined position relative to the point of reference.

30. The method as recited in claim 26, wherein determining the position of the target comprises determining that the target is positioned in a first region of the at least two regions based on the signal.

31. The method as recited in claim 30, further comprising tracking movement of the target by determining that the target is moved from the first region to a second region based on the signal.

32. The method as recited in claim 30, wherein the volume of space over the sensor is divided into at least four regions.

33. The method as recited in claim 32, wherein respective ones of the at least four regions comprise quadrants located at cardinal directions with respect to the center of the plurality of sensors.

34. The method as recited in claim 30, wherein the volume of space over the sensor is divided into at least eight regions.

35. The method as recited in claim 34, wherein respective ones of the at least eight regions are located at cardinal or ordinal directions with respect to the center of the plurality of sensors.

36. The method as recited in claim 30, further comprising using the determined position to determine an attribute based on the determined position relative to the point of reference.

37. The method as recited in claim 30, wherein the attribute comprises a gesture this is associated with a function to be performed by the processor responsive to determination of the attribute.

* * * * *